July 27, 1943. J. KING Re. 22,354

CONNECTING PIN

Original Filed May 27, 1942

INVENTOR.
James King
BY
Arthur J. O'Connor
Agent

Reissued July 27, 1943

Re. 22,354

UNITED STATES PATENT OFFICE 22,354

CONNECTING PIN

James King, Glendale, Calif.

Original No. 2,292,128, dated August 4, 1942, Serial No. 444,725, May 27, 1942. Application for reissue May 13 1943, Serial No. 486,882

6 Claims. (Cl. 85—4)

The invention relates to connecting pins of the type commonly used to pivotally connect brake levers, brake connecting rods and similar parts of the brake rigging of a freight car. The conventional connecting pin used for this purpose comprises a round elongated metal pin having a headed portion at one end and being provided adjacent its opposite end with a transverse bore adapted to receive a cotter pin, said headed portion and said cotter pin being adapted to prevent or limit the longitudinal movement of the connecting pin after assembly. For the purpose of illustrating one of the uses of a connecting pin I show, in the accompanying drawing, a portion of a connection rod having a bifurcated end portion pivotally connected to the end portion of a brake lever. The method of connecting such a rod and lever, with the conventional connecting pin, is to insert the connecting pin through the aligned apertures in the furcations and the aperture in the end of the brake lever until the headed portion of the connecting pin is in abutting engagement with the outer face of one of the furcations, the opposed end of the pin extending outwardly and beyond the outer face of the other furcation. A cotter pin is then inserted through the bore in the exposed end of the connecting pin and spread in the usual way.

One of the serious objections to the use of a cotter pin, for holding the connecting pin in assembled position, is that the cotter pin has small resistance to wear and corrosion, resulting in the cotter pin becoming progressively weaker and the eventual falling out of the cotter pin, permitting the separation of the members with which it is associated, sometimes with serious consequence in a moving train of cars.

An object of my invention is to provide a double-headed connecting pin wherein the means for preventing longitudinal movement of the pin, in the assembly, will comprise a rugged head on both ends of the pin, insuring equal resistance to longitudinal movement of the pin at both ends thereof.

A further object is to provide a novel, two-piece connecting pin which, after assembly with the brake rigging, will provide a rugged headed portion at both ends of the pin, these headed portions having ample and equal resistance to wear against the members with which the pin is associated.

A further object is to provide a pin for pivotally connecting devices wherein the means for holding the pin against longitudinal displacement will be an integral part of the pin and therefore not subject to wear due to vibration (as in the case of a cotter pin loosely carried within the bore in the end of the conventional connecting pin for brake rigging).

In the drawing, Figure 1 is a side elevation of a portion of a brake lever, a portion of a connecting rod, and the connecting pin of my invention pivotally securing the lever and rod.

Figure 1:
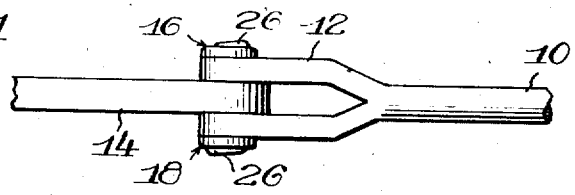
Figure 2:
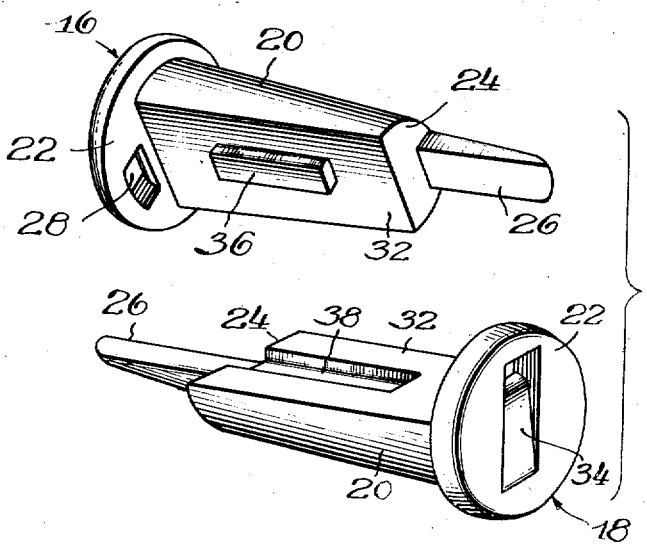
Fig. 2 is a perspective view of the two parts of my connecting pin.
Figure 3:
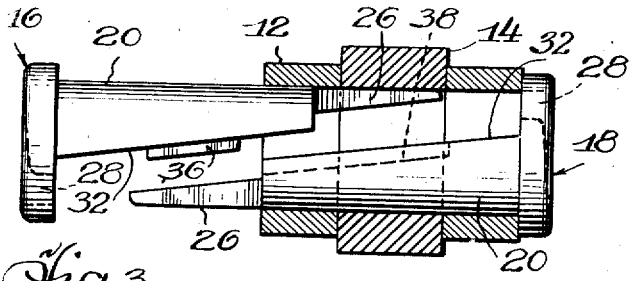
Fig. 3 is a side elevation of the two parts of the connecting pin, one of the parts being in assembled position in the aligned apertures of the brake lever and connecting rod jaws, the other part being shown in starting position, the brake lever and connecting rod jaws being shown in section.
Figure 5:
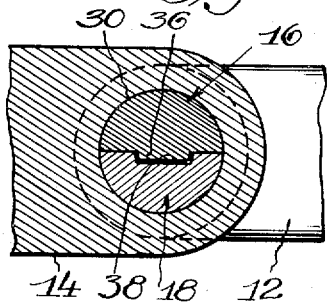
Fig. 5 is a sectional view taken along line 5—5 of Fig. 4.

In the drawing, for purpose of illustrating one of the uses of the connecting pin, I show a fragment of a brake connecting rod 10 having a forked end portion 12, the jaws of the forked end portion being adapted to receive therebetween the end portion of a brake lever 14, the jaws of the forked end portion and the brake lever being apertured to receive the connecting pin. My improved connecting pin may comprise a pair of members 16 and 18, and each of these members may comprise an elongated shank portion 20, a headed portion 22 on one end of the shank portion 20 and a shouldered portion 24 and a longitudinally extending reduced portion or lug 26 projecting from said shouldered portion. The headed portion 22 of each of the members 16 and 18 may extend laterally with respect to the shank portion and may be provided with an aperture 28 therethrough.

The shank portion 20 may have a round side 30 and a flat side 32, the round side extending perpendicular to the plane of the headed portion 22, and the flat side being preferably inclined with respect to said plane and to the round side, the shank portion being substantially half round in cross section configuration.

Figure 4:
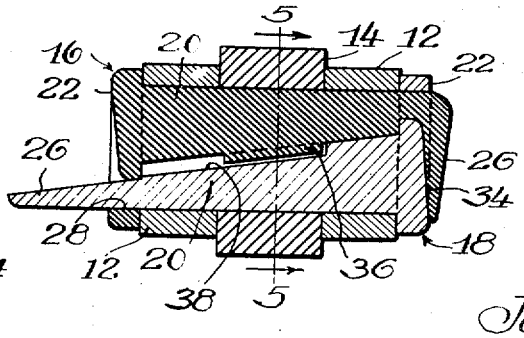
Fig. 4 is a view similar to Fig. 3, showing both parts of the connecting pin in assembly with the brake lever and jaws of the connecting rod, one of the fastening lugs of one of the parts of the connecting pin being shown bent over to hold the two parts of the pin together.

The invention contemplates the use of a member 16 and a member 18 with their shank portions in lengthwise contact, the contacting surfaces of the members being in flatwise engagement with each other and inclined with respect to and being bisected by the longitudinal axis of the assembled pin, the headed portions 22 of the pair of members being at opposed ends of the assembled pin, and the lug 26 of each of the members extending through and beyond the apertured headed portion of the adjacent member. After the pair of complementary members have been assembled within the aligned apertures of the devices to be connected, one of the projecting lugs 26 may be bent over at substantially right angles and into abutting engagement with the outer surface of the adjacent headed portion 22, as best shown in Fig. 4 of the drawing, whereby to maintain the pair of members in cooperative engagement. A depressed, laterally extending portion 34 may be provided in the outer surface of the headed portion 22, adjacent the aperture therein, whereby the bent-over lug 26 may be embedded into said outer surface. The contacting surface or flat side 32 of one of the shank portions 20 may be provided with a longitudinally extending raised rib 36, and the adjacent shank portion 20 may have a longitudinally extending depressed slot 38, said rib and slot being in registering alignment with each other and being adapted to interlock with each other when the pair of members are assembled.

While I prefer to have the contacting surfaces of the assembled shank portions 20—20 inclined with respect to the longitudinal axis of the assembled pin, whereby to obtain a wedging action between the contacting surfaces, it will be apparent that these contacting surfaces may be in a plane parallel with the longitudinal axis of the assembled pin and I contemplate such a structure. While I prefer to bend over only one of the lugs 26, to maintain the pin in assembled position, both lugs may be bent over without departing from the scope of my invention. The use of the rib 36 and the cooperating slot 38 may also be dispensed with if desired, in which event it will be noted that each member of the connecting pin will be identical, eliminating the necessity for more than one set of dies or patterns and making it unnecessary to have one male and one female member for each connecting pin.

While I have shown and described my invention as a connecting pin for use with brake rigging on railroad cars, it will be apparent to those skilled in the art that said pin may be used in connection with devices of many kinds, and I contemplate such alternate uses.

Having thus described my invention, what I claim as new and desire to secure by Letters Patent of the United States is:

1. A connecting pin, including a shank portion with a head portion at each end thereof, comprising a pair of complementary members, each member including an elongated shank portion flat on one side and round on the other side, a laterally offset head portion at one end and a shouldered longitudinally extending reduced portion at the opposite end of said last named shank portion, said offset head portion having an aperture therethrough, the shank portions of said members being disposed in lengthwise contact side by side with their contacting surfaces in flatwise engagement with each other, the shouldered portion of each member abutting the offset head portion of the other member, the reduced end portion of each member extending through and beyond the aperture of the other member, one of said reduced end portions being bent over against the adjacent head portion to maintain said pair of members in cooperative engagement with each other.

2. A connecting pin, including a shank portion with a head portion at each end thereof, comprising a pair of complementary members, each member including an elongated shank portion, a laterally offset apertured head portion at one end and a shouldered reduced portion at the opposed end of said last named shank portion, the shank portions of said members being disposed in lengthwise contact adjacent and with their contacting surfaces inclined to the longitudinal axis of said pin, the shouldered portion of one member abutting and the reduced portion extending through and beyond the apertured head portion of the other member, said reduced portion being bent over against said last named head portion to maintain said pair of members in cooperative assembled engagement.

3. A pin for connecting devices having apertures therethrough, including an elongated cylindrical shank portion with a headed portion at opposed ends thereof; comprising a pair of complementary members, each member including a shank portion round on one side and substantially flat on the other side, a laterally extending apertured headed portion at one end and a shouldered longitudinally extending lug at the opposed end of said last named shank portion, the substantially flat side of one of said last named shank portions having a longitudinally extending raised rib thereon, the substantially flat side of the other of said last named shank portions having a longitudinally extending depressed slot therein, the shank portions of said members being disposed in lengthwise contact side by side within the aligned apertures of said devices, the contacting surfaces being in flatwise engagement and said rib and said slot being in interlocking engagement with each other, the said lug of one of said members extending through and beyond the apertured headed portion of the adjacent member and being bent over against said headed portion whereby to maintain the pair of members against longitudinal movement with relation to each other.

4. A connecting pin, including a shank portion with a head at each end thereof, comprising a pair of complementary members, each member including an elongated shank portion with a laterally disposed head at one end thereof, the shank portions of said pair of members being disposed in lengthwise abutting side-by-side engagement with each other; the head of one of said members having an aperture therein, the non-headed end portion of the other of said members extending through and beyond said aperture; the non-headed end portion of said one of said members having abutting engagement with the head of the adjacent member, the said end portion extending beyond said aperture being bent over against the adjacent head to maintain the pair of members in assembled relationship, adapted to maintain a predetermined spacing between the opposed heads of said pins.

5. The combination of claim 2, wherein each member of said pair of members is substantially identical with the other member, whereby any two of said members may be used to assemble said connecting pin, thereby eliminating the necessity for sorting said members into pairs of cooperative complementary members.

6. The combination of claim 4, wherein one of the longitudinal sides of each of said shank portions is arcuate, the assembled shank portions of said pair of members combining to form a substantially round split shank for said connecting pin.

JAMES KING.